US012565146B2

(12) United States Patent
Tagashira et al.

(10) Patent No.: US 12,565,146 B2
(45) Date of Patent: Mar. 3, 2026

(54) DRIVING ASSISTANCE DEVICE AND A NON-TRANSITORY STORAGE MEDIUM

(71) Applicant: TOYOTA JIDOSHA KABUSHIKI KAISHA, Toyota (JP)

(72) Inventors: Yuto Tagashira, Toyota (JP); Kazuki Fukazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 34 days.

(21) Appl. No.: 18/627,053

(22) Filed: Apr. 4, 2024

(65) Prior Publication Data

US 2024/0336194 A1    Oct. 10, 2024

(30) Foreign Application Priority Data

Apr. 6, 2023    (JP) ................................. 2023-062362

(51) Int. Cl.
*B60Q 9/00* (2006.01)
*G01S 15/931* (2020.01)
(52) U.S. Cl.
CPC ............ *B60Q 9/008* (2013.01); *G01S 15/931* (2013.01); *G01S 2015/938* (2013.01)
(58) Field of Classification Search
None
See application file for complete search history.

(56) References Cited

U.S. PATENT DOCUMENTS 10,429,506 B2    10/2019  Tanaka et al.
2007/0291590 A1 *  12/2007  Harada ................... G01S 15/87
367/99

2010/0245065 A1 *  9/2010  Harada ................. G01S 15/003
340/435
2016/0207532 A1 *  7/2016  Kida ...................... G01S 13/931
2017/0008517 A1    1/2017  Himi
2020/0298844 A1 *  9/2020  Ikuta ..................... G01S 15/931
2024/0005669 A1 *  1/2024  Niwa .............. B60W 30/18036
2025/0065894 A1 *  2/2025  Luo ................... B60W 50/0205

FOREIGN PATENT DOCUMENTS

JP        2006-168525 A        6/2006
JP        2017-013756 A        1/2017
JP        2017-078315 A        4/2017

* cited by examiner

*Primary Examiner* — Daniel L Greene

(74) *Attorney, Agent, or Firm* — Finnegan, Henderson, Farabow, Garrett and Dunner, LLP

(57) ABSTRACT

A driving assistance device (10) having a processor (12) that executes a process of detecting objects around a vehicle (1), wherein the processor is configured to execute following processes: obtaining first detection values outputted from a plurality of sonar sensors provided in the vehicle, second detection values indicating the state of the shift range, and third detection values corresponding to the steering angle of the steering device, controlling a notification device (20) that operates in conjunction with the first detection values and adjusting notification contents to be output, calculating the relative distance between the vehicle and the objects existing around the vehicle based on the first detection values, determining the traveling direction of the vehicle based on the second detected values, calculating priorities according to the sonar sensors individually based on the traveling direction and the steering angle, adjusting the notification contents according to level of the priorities.

4 Claims, 7 Drawing Sheets

| SHIFT POSITION | STEERING ANGLE | SONAR SENSOR | POSITION | DETECTION VALUE | PRIORITY | PARAMETER | SOUND OUTPUT (AFTER ADJUSTMENT) | IMAGE OUTPUT (AFTER ADJUSTMENT) |
|---|---|---|---|---|---|---|---|---|
| R | θ | S1 | LEFT FRONT CORNER | A1 | G1 | Q1 | Q1*C1 | Q1*D1 |
| | | S2 | RIGHT FRONT CORNER | A2 | G2 | Q2 | Q2*C2 | Q2*D2 |
| | | S3 | REAR LEFT CORNER | A3 | G3 | Q3 | Q3*C3 | Q3*D3 |
| | | S4 | REAR RIGHT CORNER | A4 | G4 | Q4 | Q4*C4 | Q4*D4 |
| | | S5 | LEFT REAR CORNER | A5 | G5 | Q5 | Q5*C5 | Q5*D5 |
| | | S6 | RIGHT REAR CORNER | A6 | G6 | Q6 | Q6*C6 | Q6*D6 |

(A)                                    (B)

DRIVING ASSISTANCE DEVICE AND A NON-TRANSITORY STORAGE MEDIUM

CROSS-REFERENCE TO RELATED APPLICATIONS

This application claims priority to Japanese Application No. 2023-062362, filed Apr. 6, 2023.

FIELD

The present disclosure relates to a driving assistance device and a non-transitory storage medium capable of detecting an obstacle around a vehicle.

BACKGROUND

A technique of preventing objects existing around a vehicle from contacting the vehicle based on an output of a plurality of corner sensors provided in the vehicle is known (Japanese Unexamined Patent Publication No. 2017-013756; JP2017-013756A).

According to the technique described in JP2017-013756A, the vehicle is configured to detect a distance between the vehicle and the objects based on a plurality of corner sensors arranged at different positions, and to generate alarms in case of the objects approaching the vehicle are detected.

SUMMARY

According to the technique described in JP2017-013756A, the alarms are activated in case of the objects are detected by a plurality of sonar sensors. However, while the vehicle is moving, there is a possibility that the driver may feel troublesome with respect to the warning by outputting the warning despite a decrease in the possibility that the corner sensors detecting the separation from the objects approaches the objects.

An object of the present disclosure is to provide a driving assistance device and a non-transitory storage medium capable of optimizing notification contents for detected the objects.

According to an aspect of the present disclosure, there is provided a driving assistance device having a processor that executes a process of detecting objects around a vehicle, wherein the processor is configured to execute following processes: obtaining first detection values outputted from a plurality of sonar sensors provided in the vehicle, second detection values indicating the state of the shift range, and third detection values corresponding to the steering angle of the steering device, controlling a notification device that operates in conjunction with the first detection values and adjusting notification contents to be output, calculating the relative distance between the vehicle and the objects existing around the vehicle based on the first detection values, determining the traveling direction of the vehicle based on the second detected values, calculating priorities according to the sonar sensors individually based on the traveling direction and the steering angle, adjusting the notification contents according to level of the priorities.

According to the present disclosure, it is possible to optimize the notification contents for the detected objects.

BRIEF DESCRIPTION OF DRAWINGS

FIG. 4 is a diagram illustrating a method of adjusting notification content based on a parameter corresponding to priority.

DESCRIPTION OF EMBODIMENTS

Figure 1:
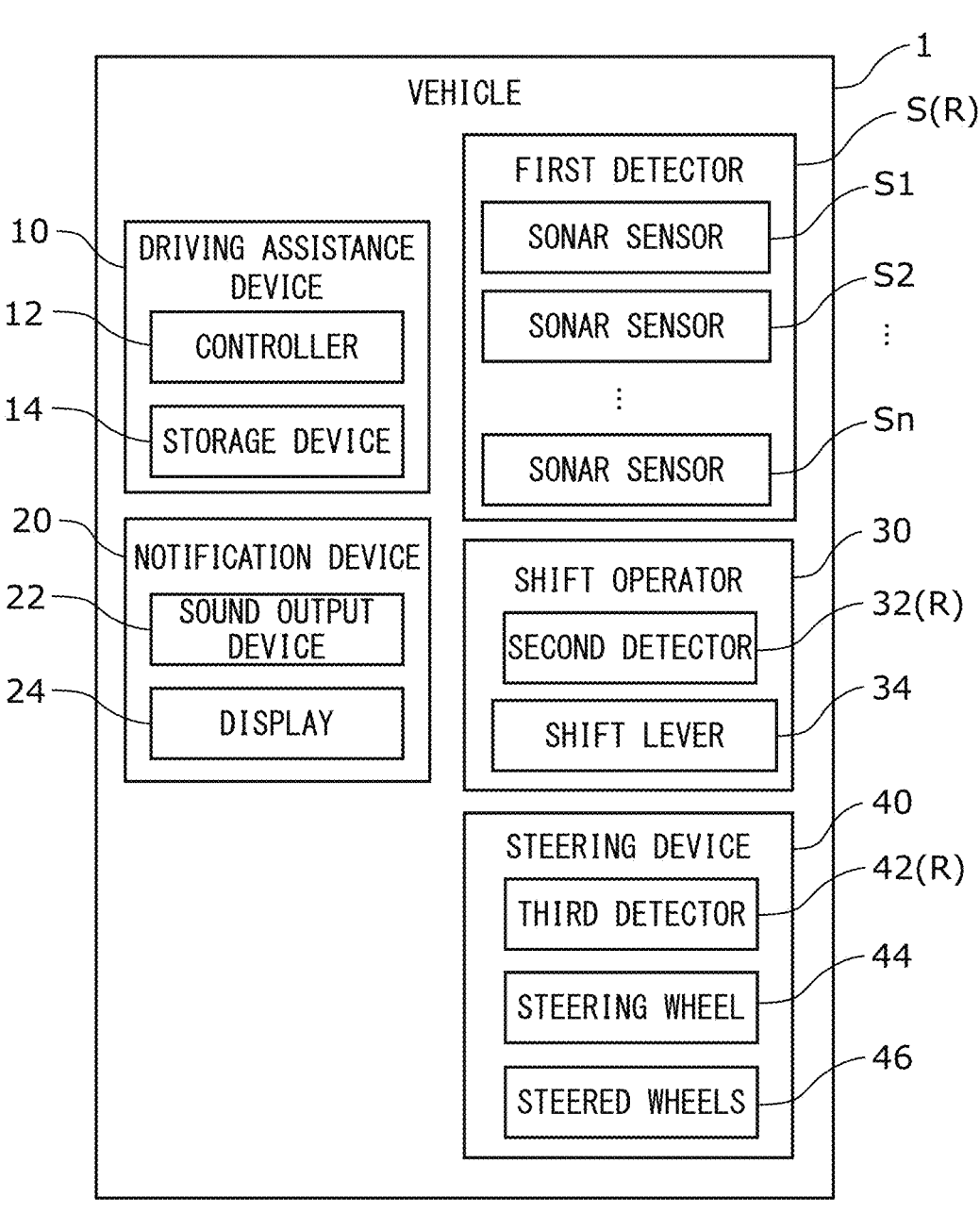
FIG. 1 is a block diagram illustrating a configuration of a vehicle according to an embodiment of the present disclosure.
Figure 2:
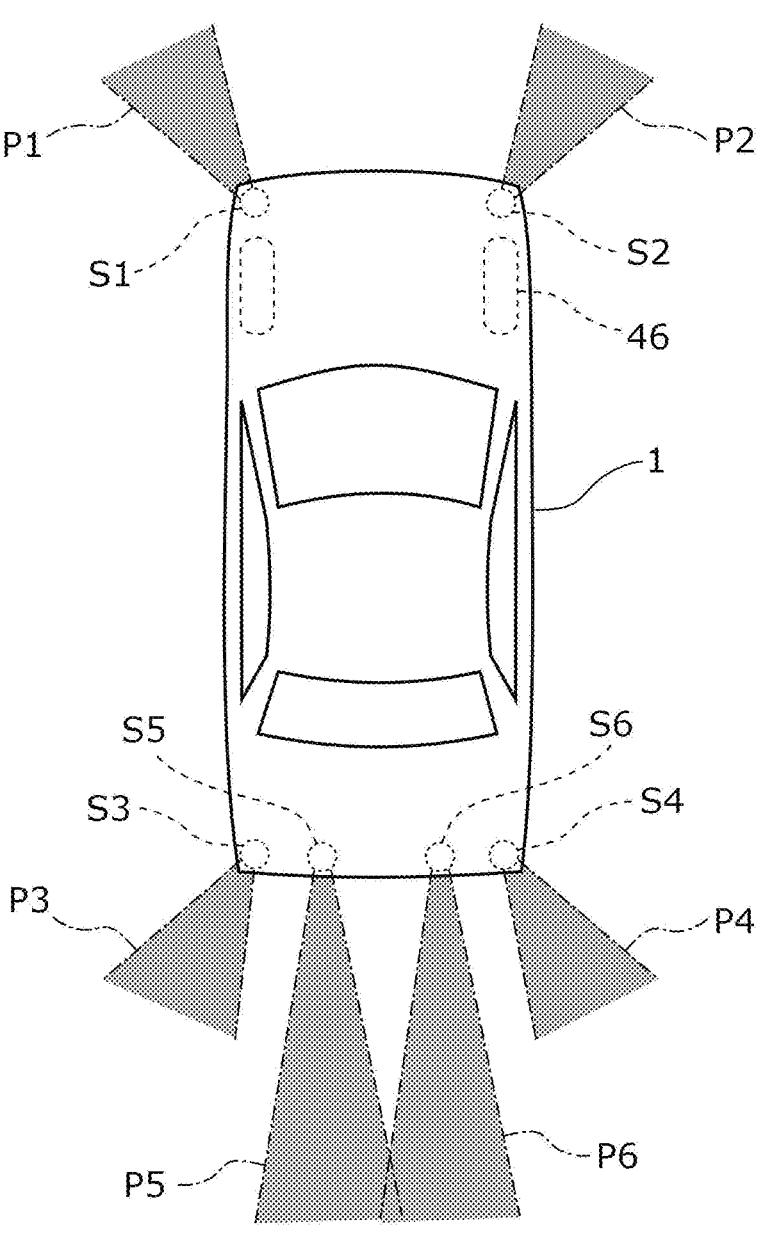
FIG. 2 is a diagram illustrating a sonar sensor disposed in a vehicle.

As illustrated in FIGS. 1 and 2, the vehicle 1 includes a detector R provided in the vehicle main body, and a driving assistance device 10 that supports driving of the vehicle 1 based on detection values detected by the detector R. The detector R includes, for example, a first detector S having a plurality of sonar sensors Sn (n is an arbitrary natural number). The detector R includes a second detector 32 provided in the shift operator 30 for operating the shift. The detector R includes a third detector 42 provided in a steering device 40 for steering the vehicle 1.

The first detector S detects objects existing around the vehicle 1 based on the detection values of the plurality of sonar sensors Sn. The sonar sensor Sn is, for example, an ultrasonic distance sensor that detects distances to objects. The sonar sensor Sn outputs ultrasonic wave and receive a reflection wave reflected by the ultrasonic wave from the object. The sonar sensor Sn outputs a first detection value based on an output data and a received data.

A pair of sonar sensors S1, S2 are provided, for example, in a front bumper of the vehicle 1. The sonar sensor S1 is provided at a front left corner of the vehicle 1 and detects an area P1 on a front left side of the vehicle 1. The sonar sensor S2 is provided at a right front corner of the vehicle 1 and detects an area P2 on a right front side of the vehicle 1.

Sonar sensors S3-S6 are provided in, for example, a rear bumper of the vehicle 1. The sonar sensor S3 is provided at a left rear corner of the vehicle 1 and detects an area P3 on a left rear side of the vehicle 1. The sonar sensor S4 is provided at a right rear corner of the vehicle 1 and detects an area P4 on a right rear side of the vehicle 1. The sonar sensor S5 is provided on a left rear side of the vehicle 1 and detects an area P5 on a left rear side of the vehicle 1. The sonar sensor S6 is provided on a right side of a rear portion of the vehicle 1 and detects an area P6 on a right side of the rear portion of the vehicle 1. The above-described number and arrangement of the sonar sensors Sn are exemplary. The sonar sensors Sn may be configured based on the number and the arrangement relation that differ from the above.

The shift operator 30 is provided with, for example, a shift lever 34 that receives an operation for changing shift range of the vehicle 1 based on an operation by the driver. The shift lever 34 changes the shift range based on an operation by the driver. By changing the shift range, the operation of the vehicle 1 such as forward, backward, parking, and neutral is changed. The shift lever 34 may be configured by another device such as a button if it can accept an operation for changing the state of the shift range of the vehicle 1.

The shift lever 34 is provided with a second detector 32 that detects state of the shift range. The second detector 32 is a shift position sensor that detects the state of the shift range based on the position of the shift lever 34. The second detector 32 outputs, for example, second detection values indicating a state of a shift range such as driving, backward movement, parking, or neutral based on the position of the shift lever.

The steering device 40 includes a steering wheel 44 to be operated by the driver. The steering device 40 includes a steered wheels 46 which are steered in conjunction with the steering wheel 44. The steered wheels 46 are, for example, a pair of front wheels provided in the vehicle 1. The steered wheels 46 may also be provided on a pair of rear wheels. The steering device 40 adjusts steering angle θ of the steered wheels 46 in accordance with the rotational angle θ0 of the steering wheel 44. The steered wheels 46 adjust direction of the vehicle 1 based on the steering angle. The rotational angle θ0 of the steering wheel 44 and the steering angle θ of the steered wheels 46 operate in conjunction with each other based on a predetermined ratio.

The steered wheels 46 may be drive wheels or may adjust the direction of the vehicle 1 based on a rotational difference between the pair of front wheels or rear wheels. In this case, the steering device 40 may apply a rotational difference corresponding to the steering angle θ to the steered wheels 46 in accordance with the rotational angle θ0 of the steering wheel 44.

The third detector 42 detects third detection values indicating a rotation angle of the steering wheel 44 provided in the steering device 40. The third detector 42 detects the third detection values corresponding to the steering angle θ of the steered wheels 46. The first detection values, the second detection values, and the third detection values are output to the driving assistance device 10.

The driving assistance device 10 includes a controller 12 that controls a notification device 20 based on detection values acquired from the detector R. The driving assistance device 10 includes a storage device 14 in which data and programs necessary for control are stored. The storage device 14 is constituted by a non-transitory storage medium such as a hard disk drive (HDD) or a flash memory, for example. The storage device 14 may be built in the driving assistance device 10 or may be externally connected to the driving assistance device 10.

The controller 12 includes, for example, a hardware processor such as a CPU (Central Processing Unit). The controller 12 executes various kinds of processing based on various kinds of computer programs stored in the storage device 14. For example, the controller 12 controls the notification device 20 based on the detection values formed by the detector R.

The notification device 20 notifies notification contents corresponding to the plurality of sonar sensors individually. The notification contents correspond to the plurality of sonar sensors Sn individually and include a plurality of predetermined notification contents notified based on a predetermined mode. The predetermined notification contents are, for example, notification contents based on voices, or sounds, or notification contents based on images.

The notification device 20 includes, for example, a sound output device 22 that outputs predetermined alarms based on the sounds. The notification device 20 includes a display 24 that outputs predetermined alarms based on the display images. The sound output device 22 includes, for example, a speaker. The sound output device 22 is controlled by the controller 12. The sound output device 22 outputs notification contents based on the sounds corresponding to the first detected values detected by the sonar sensors Sn. For example, the sound output device 22 outputs standard-level sounds in case of the distance between the obstacle detected by the sonar sensors Sn and the vehicle 1 is equal to or smaller than predetermined values. The sound output device 22 outputs, for example, notification contents corresponding individually to a plurality of sonar sensors S1-S6.

The display 24 is constituted by, for example, a display device capable of outputting images such as a liquid crystal display. The display 24 is controlled by the controller 12. The display 24 outputs the notification contents based on the images corresponding to the first detection values detected by the sonar sensors Sn. For example, in case of the distance between the obstacle detected by the sonar sensors Sn and the vehicle 1 is equal to or smaller than the predetermined values, the display 24 outputs notification images indicating the predetermined notification contents. For example, the display 24 outputs notification images individually corresponding to the plurality of sonar sensors S1-S6.

FIG. 3A illustrates an arrangement relation between objects B1, B2 existing around the vehicle 1 and the vehicle 1. In FIG. 3A, the object B1 is present on the left side of the vehicle 1. The object B2 is present on the right side of the vehicle 1. The steered wheels 46 of the vehicle 1 are in a state of a predetermined steering angle in the leftward direction. The vehicle 1 is in a state of starting traveling to the rear side. The sonar sensor S1 detects the object B1 on the left side of the vehicle 1. The sonar sensor S2 detects the object B2 on the right side of the vehicle 1. As described above, the notification device 20 operates in conjunction with the first detection values detected by the sonar sensors Sn.

In this condition, the vehicle 1 travels based on a travel track W that is separated from the object B1 and approaches the object B2. The driver needs to pay attention to the object B2 approaching the vehicle 1 as compared with the object B1 separated from the vehicle 1. Therefore, the driving support device 10 restricts the notification contents corresponding to the sonar sensor S1 as compared with the notification contents corresponding to the sonar sensor S2.

FIG. 3B illustrates an arrangement relation between the objects B1, B2 existing around the vehicle 1 and the vehicle 1. In FIG. 3B, the object B1 is present on the left side of the vehicle 1. The object B2 is present on the right side of the vehicle 1. The steered wheels 46 of the vehicle 1 are in a state of a predetermined steering angle in the right direction. The vehicle 1 is in a state of starting traveling to the rear side. The sonar sensor S1 detects the object B1 on the left side of the vehicle 1. The sonar sensor S2 detects the object B2 on the right side of the vehicle 1. As described above, the notification device 20 operates in conjunction with the first detection values detected by the sonar sensors Sn.

In this condition, the vehicle 1 travels based on a travel track W that is separated from the object B2 and approaches the object B2. The driver needs to pay attention to the object B1 approaching the vehicle 1 as compared with the object B2 separated from the vehicle 1.

The controller 12 controls the notification device 20 by using the calculation result of the position of objects Bm (m is an arbitrary natural number) based on the first detection values, the determination result of the traveling direction of the vehicle 1 based on the second detection values, and the calculation result of the steering angle of the steered wheels 46 based on the third detection values, and changes the notification contents to be outputted.

The controller 12 calculates the relative distance between the vehicle 1 and one or more objects Bm present around the vehicle 1 based on the first detected values outputted from the plurality of sonar sensors Sn provided in the vehicle 1.

The controller 12 determines the state of the shift range based on the second detection values output from the second detector 32 provided in the shift lever 34. The controller 12 determines the traveling direction of the vehicle 1 based on the determination result of the state of the shift range. The controller 12 calculates the steering angle of the steered wheels 46 based on the third detection values output from the third detector 42 provided in the steering wheel 44.

The controller 12 calculates a future traveling track W of the vehicle 1 based on the traveling direction of the vehicle 1 and the steering angle of the steered wheel 46. For example, the controller 12 calculates the travel track W based on the second detection value of the shift lever 34 and the steering angle of the steered wheels 46 corresponding to the third detection value (rotation angle $\theta_0$) of the steering wheel 44. The controller 12 calculates a future change in the distance between the objects Bm and the respective sonar sensors based on the calculated travel trajectory W. The controller 12 individually calculates the priorities of the respective sonar sensors Sn based on the calculation result. For example, the controller 12 determines a change in the distances between the objects Bm and the respective sonar sensors based on the travel track W.

Figure 3:
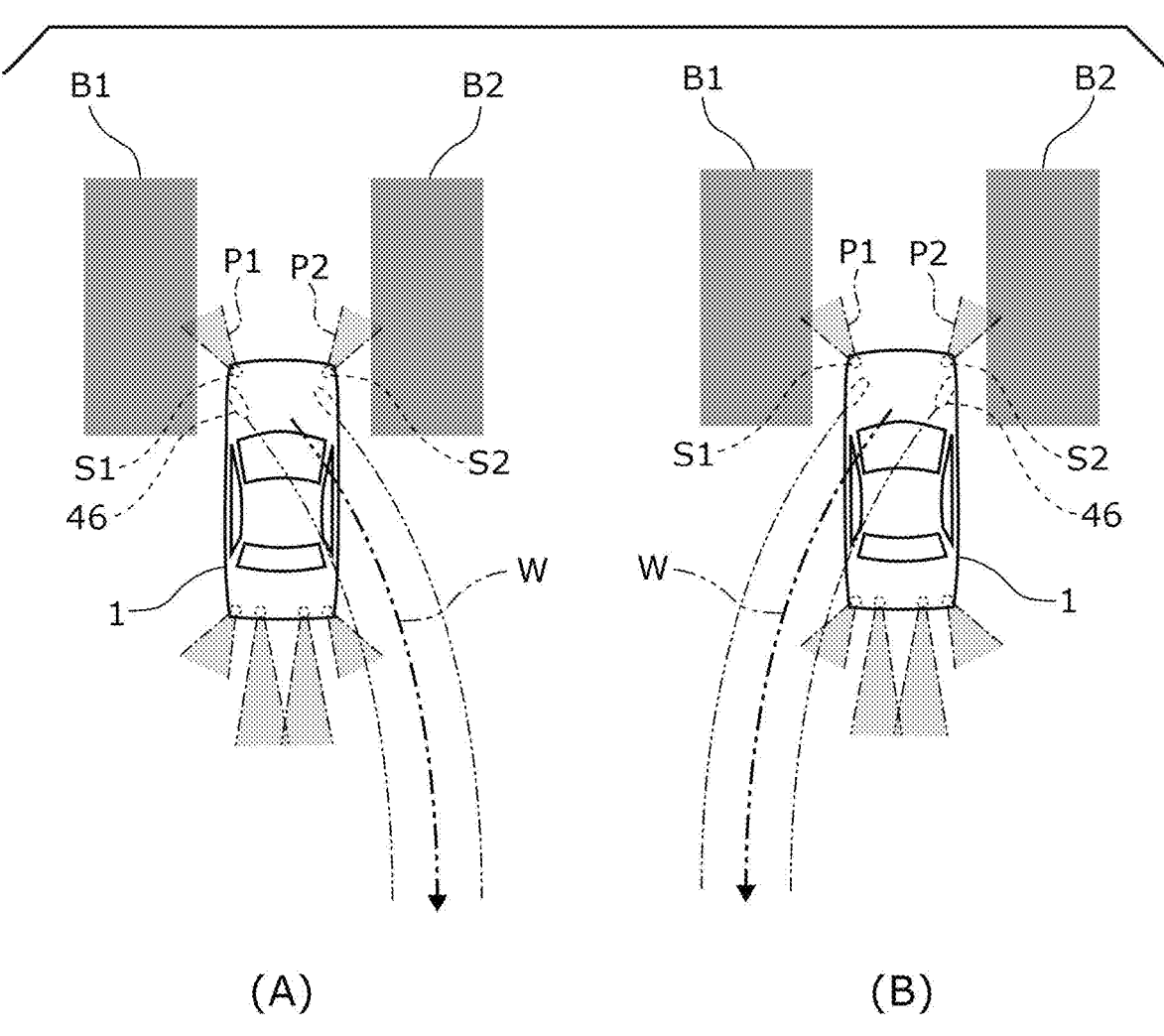
FIG. 3 is a diagram illustrating a travel track of a vehicle in a state where an object is detected.

The controller 12 calculates the distance to increase the priority, in case of determining that the distance between the objects Bm and the respective sonar sensors are approaching in the future. The controller 12 calculates the priorities to be low, in case of determining that the distance between the objects Bm and the respective sonar sensors is to be separated in the future. In FIG. 3, the controller 12 sets the notification contents of the notification device 20 according to the sonar sensor S1 that has detected the object B1 and the sonar sensor S2 that has detected the object B2.

In FIG. 3A, the controller 12 determines that the distance between the object B1 and the sonar sensor S1 is separated in the future based on the calculated travel track W and determines that the distance between the object B2 and the sonar sensor S2 is approaching in the future. The controller 12 calculates the priority of the sonar sensor S1 to be lower than the priority of the sonar sensor S2.

The controller 12 sets the notification contents of the notification device 20 according to the sonar sensor S1 that has detected the object B1 and the sonar sensor S2 that has detected the object B2. The controller 12 determines that the distance between the object B1 and the sonar sensor S1 is separated in the future based on the calculated travel track W and determines that the distance between the object B2 and the sonar sensor S2 is approaching in the future. The controller 12 calculates the priority of the sonar sensor S1 to be lower than the priority of the sonar sensor S2.

In FIG. 3B, the controller 12 determines that the distance between the object B2 and the sonar sensor S2 is separated in the future based on the calculated travel track W and determines that the distance between the object B1 and the sonar sensor S1 is approaching in the future. The controller 12 calculates the priority of the sonar sensor S2 to be lower than the priority of the sonar sensor S1.

As illustrated in FIG. 4, the controller 12 adjusts a plurality of parameters for controlling the outputs of the notification contents based on the calculated priorities calculation results. For example, the controller individually adjusts the plurality of parameters individually assigned to the plurality of sonar sensors in accordance with level of the priorities. The controller 12 controls the notification device 20 based on the adjusted parameter, and individually changes the predetermined notification contents corresponding to the sonar sensors Sn. The controller 12 decreases the level of the predetermined notification contents corresponding to the sonar sensors Sn in accordance with the decrease in priorities, in case of there are one or more sonar sensors Sn whose priorities tends to decrease.

Figure 5:
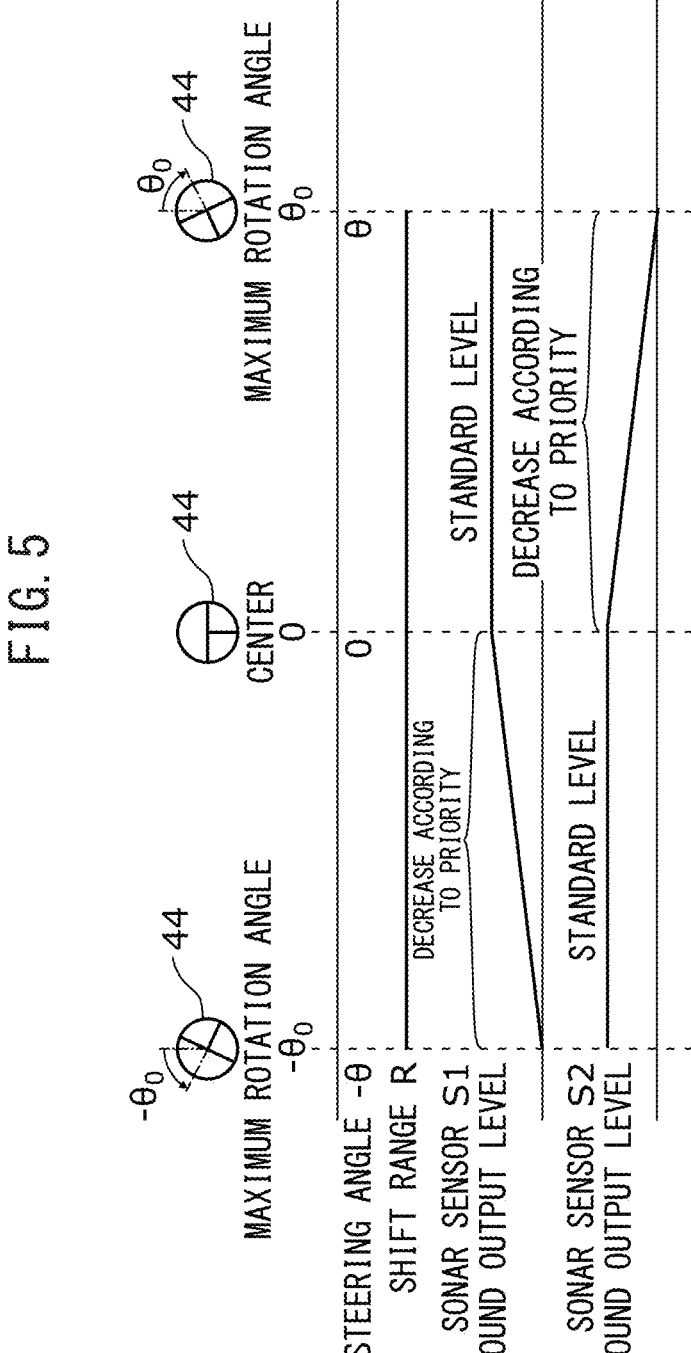
FIG. 5 is a diagram illustrating an audio output level adjusted according to priority.

As illustrated in FIG. 5, the controller 12 adjusts the output of the sound output device 22 based on the calculated level of the priorities. In the example of FIG. 5 illustrates a method of controlling the sound output device 22 in the state of the vehicle 1 illustrated in FIG. 3.

In the upper example of FIG. 5 illustrates a method of controlling the sound output device 22 in the state of the vehicle 1 illustrated in FIG. 3A. That is, in case of the vehicle 1 is retracted and the steered wheel 46 is left-steered, the controller 12 controls the sound output device 22 according to the priority of the sonar sensor S1 to adjust the sound output corresponding to the sonar sensor S1. The controller 12 calculates the priority of the sonar sensor S1 so as to decrease as the rotational angle $\theta_0$ of the steering wheel 44 in the leftward rotational direction increases, and adjusts the sound output level corresponding to the sonar sensor S1 to decrease as the priority decreases compared to the standard level.

In the upper example of FIG. 5 illustrates a method of controlling the sound output device 22 in the state of the vehicle 1 illustrated in FIG. 3B. That is, in case of the vehicle 1 retreats and the steered wheels 46 are in a state where the steering angle is rightward, the controller 12 controls the sound output device 22 in accordance with the priority of the sonar sensor S2 to adjust the sound output corresponding to the sonar sensor S2.

The controller 12 calculates the priority of the sonar sensor S2 to decrease as the rotational angle $\theta_0$ of the steering wheel 44 increases and adjusts the sound output level corresponding to the sonar sensor S2 so as to decrease as the priority decreases compared to the standard level.

According to the driving assistance device 10, in case of the notification contents are output to the sound output device 22 based on the first detection values detected by the sonar sensors Sn, the notification contents of the sonar sensors Sn are adjusted according to the priorities so that the driver can be appropriately urged to pay attention.

Figure 6:
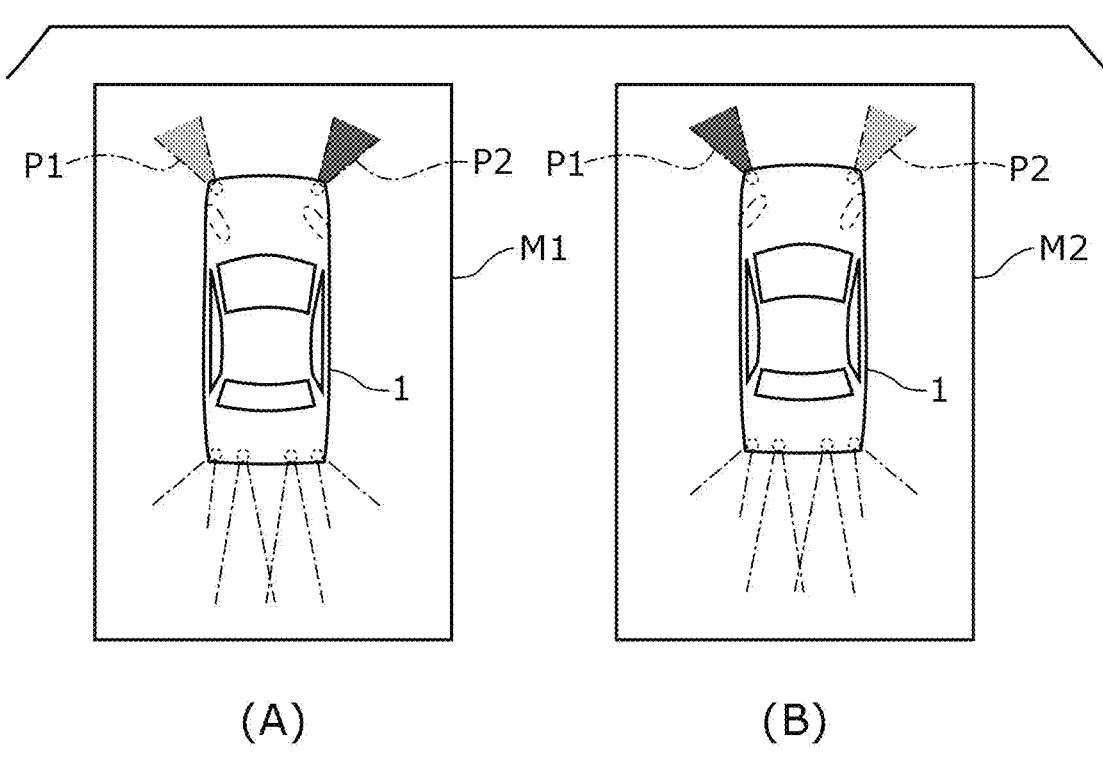
FIG. 6 is a diagram illustrating an example of a display image adjusted according to priority.

As illustrated in FIG. 6, the controller 12 may adjust display images M1, M2 displayed on the display 24 based on the calculated level of priority.

An example of In FIG. 6A, the display image M1 is displayed on the display 24 in the state of the vehicle 1 illustrated in FIG. 3A. The controller 12 controls the display 24 in accordance with the priority of the sonar sensor S1 to adjust the display image M1 corresponding to the sonar sensor S1. The controller 12 calculates the priority of the sonar sensor S1 to decrease as the rotational angle $\theta_0$ of the steering wheel 44 increases. The controller 12 causes the color of the area P1 corresponding to the sonar sensor S1 in the display image M1 to be displayed in a different color or a different display mode compared with the color of the area P1 of the standard level as the priority level decreases.

In FIG. 6B, the display image M2 is displayed on the display 24 in the state of the vehicle 1 illustrated in FIG. 3B. The controller 12 controls the display 24 in accordance with the priority of the sonar sensor S2 to adjust the display image M2 corresponding to the sonar sensor S2. The controller 12 calculates such that the priority of the sonar sensor S2 decreases as the rotational angle $\theta_0$ of the steering wheel 44 increases. The controller 12 causes the color of the region P2 corresponding to the sonar sensor S2 in the display image M2 to be displayed in a different color or a different display mode compared with the color of the region P1 of the standard level as the priority level decreases.

According to the driving assistance device 10, in case of the display 24 is caused to output the display images based on the first detected values detected by the sonar sensors Sn, the driver can be appropriately urged to pay attention by adjusting and displaying the sonar sensors Sn according to the priorities. The processing of the controller 12 described above has been exemplified in a case where the vehicle 1 moves backward. The processing of the controller 12 may also be applied in case of the vehicle 1 moves forward.

Figure 7:
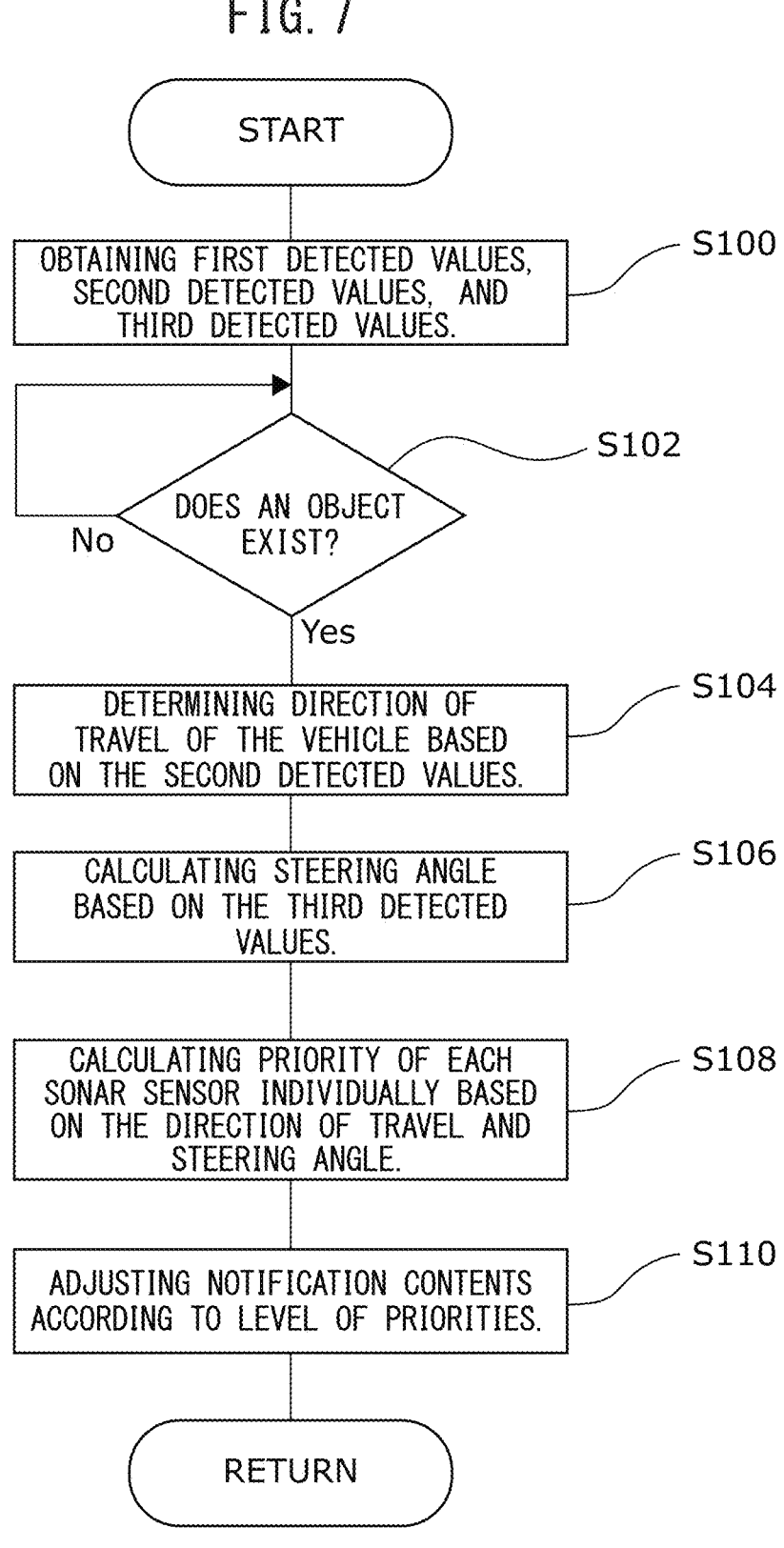
FIG. 7 is a flowchart illustrating a flow of processing of a driving support method executed in the driving assistance device.

FIG. 7 shows a flow of processing of the driving assistance method executed in the driving assistance device 10. The driving assistance method is executed based on a computer program installed in a computer of the driving assistance device 10. The computer program causes the following processes to be executed. The controller 12 acquires the first detection values from the plurality of sonar sensors Sn provided in the vehicle 1, the second detection values from the shift lever 34 provided in the shift operating unit 30, and the third detection values from the steering wheel 44 provided in the steering device 40 (step S100). The controller 12 calculates the distance between the vehicle 1 and the object B existing around the vehicle 1 based on the first detected values and determines whether the object B exists around the vehicle 1 (step S102). The controller 12 determines the traveling direction of the vehicle 1 based on the second detected values (step S104).

The controller 12 calculates the steering angle of the steered wheels 46 of the vehicle 1 based on the third detected values (step S106). The controller 12 individually calculates the priority according to the sonar sensor Sn based on the traveling direction and the level of the steering angle (step S108). The controller 12 controls the notification device 20 that operates in conjunction with the first detection values in accordance with the calculated level of the priority level and adjusts the contents of the notification to be outputted (step S110). After executing the step S110, the controller 12 returns the process to the step S100. The controller 12 repeatedly executes the step S110 from the step S100.

As described above, according to the driving assistance device 10, it is possible to optimize the notification contents of the detected object. According to the driving assistance device 10, the notification contents corresponding to the objects detected by the sonar sensors Sn can be adjusted according to the traveling trajectory of the vehicle 1. According to the driving assistance device 10, by calculating the priorities of the sonar sensors Sn according to the traveling trajectory of the vehicle 1, the notification contents corresponding to the sonar sensors Sn in which the possibility of approaching the objects decrease are limited, and it is possible to prevent the driver from feeling troublesomeness with respect to warnings.

In the above-described embodiment, the computer program executed in each configuration of the driving assistance device 10 may be provided in a form recorded in a non-transitory computer-readable recording medium such as a semiconductor memory, a magnetic recording medium, or an optical recording medium.

The invention claimed is:

1. A driving assistance device having a processor that executes a process of detecting objects around a vehicle, wherein the processor is configured to execute the following processes:

obtaining first detection values outputted from a plurality of sonar sensors provided in the vehicle, second detection values indicating a state of a shift range, and third detection values corresponding to a steering angle of a steering device;

controlling a notification device that operates in conjunction with the first detection values and adjusting notification contents to be output;

calculating a relative distance between the vehicle and the objects existing around the vehicle based on the first detection values;

determining a traveling direction of the vehicle based on the second detected values;

calculating priorities according to the sonar sensors individually based on the traveling direction and the steering angle;

adjusting the notification contents according to levels of the priorities;

calculating a travel trajectory of the vehicle based on the traveling direction and the steering angle;

calculating a change in distance between the objects and each of the sonar sensors based on the travel trajectory;

individually determining each of the priorities based on calculation results of each of the changes in distance; and in a case where a priority of a sonar sensor decreases, decreasing a level of a predetermined notification content corresponding to the sonar sensor with decreasing priority in accordance with the decreasing priority.

2. The driving assistance device according to claim 1, wherein the notification contents correspond individually to the plurality of sonar sensors, and include a plurality of predetermined notification contents to be notified based on a predetermined aspect, and the processor is configured to execute the following process:

individually adjusting each of the plurality of predetermined notification contents according to the corresponding priorities.

3. The driving assistance device according to claim 2, wherein the predetermined notification contents are output based on audio output, and the processor is configured to execute the following process:

individually adjusting the level of each of the plurality of audio outputs corresponding to the plurality of predetermined notification contents based on the priorities.

4. A non-transitory storage medium storing a program installed in a computer mounted on a driving assistance device for detecting an obstacle around a vehicle, the program causes the computer to perform the following processes:

obtaining first detection values outputted from a plurality of sonar sensors provided in the vehicle, second detection values indicating a state of a shift range, and third detection values corresponding to a steering angle of a steering device;

controlling a notification device that operates in conjunction with the first detection values and adjusting notification contents to be output;

calculating a relative distance between the vehicle and the obstacle existing around the vehicle based on the first detection values;

determining the traveling direction of the vehicle based on the second detected values;

calculating priorities according to the sonar sensors individually based on the traveling direction and the steering angle;

adjusting the notification contents according to levels of the priorities;

calculating a travel trajectory of the vehicle based on the traveling direction and the steering angle;

calculating a change in distance between the obstacle and each of the sonar sensors based on the travel trajectory;

individually determining each of the priorities based on calculation results of each of the changes in distance; and in a case where a priority of a sonar sensor decreases, decreasing a level of a predetermined notification content corresponding to the sonar sensor with decreasing priority in accordance with the decreasing priority.

* * * * *